United States Patent [19]

Era et al.

[11] Patent Number: 5,180,786
[45] Date of Patent: Jan. 19, 1993

[54] IMPACT MODIFIER, THERMOPLASTIC RESIN COMPOSITION USING THE SAME AND MOLDED ARTICLE OBTAINED THEREFROM

[75] Inventors: Susumu Era, Ichihara; Toshio Matsumoto, Chiba; Yoshinori Kobayashi, Kisarazu; Masashi Shitara, Sodegauramachi; Isamu Hattori; Yoshihiro Nomura, both of Ichihara, all of Japan

[73] Assignee: Hitachi Chemical Company, Ltd., Tokyo, Japan

[21] Appl. No.: 432,908

[22] Filed: Nov. 7, 1989

[30] Foreign Application Priority Data

Nov. 9, 1988 [JP] Japan .................................. 63-282827
Nov. 24, 1988 [JP] Japan .................................. 63-297080
Sep. 29, 1989 [JP] Japan .................................. 1-256708
Oct. 2, 1989 [JP] Japan .................................. 1-257378

[51] Int. Cl.⁵ .................. C08F 279/02; C08F 265/06; C08F 51/04
[52] U.S. Cl. .................................... 525/281; 525/204; 525/227; 525/239; 525/241; 525/290; 525/310; 525/316; 525/64; 525/67; 525/70; 525/80
[58] Field of Search ............... 525/204, 227, 239, 241, 525/281, 290, 310, 316

[56] References Cited

FOREIGN PATENT DOCUMENTS

| | | |
|---|---|---|
| 1196130 | 10/1985 | Canada . |
| 0034748 | 9/1981 | European Pat. Off. . |
| 0042091 | 12/1981 | European Pat. Off. . |
| 0050262 | 4/1982 | European Pat. Off. . |
| 0231933 | 8/1987 | European Pat. Off. . |
| 0354330 | 2/1990 | European Pat. Off. . |

OTHER PUBLICATIONS

Translation of Japan 58-187411, Nov. 1, 1983.
Translation of European 0186047, Jul. 2, 1986.
Database WPIL, No. 85-089647, Feb. 1985.

*Primary Examiner*—James J. Seidleck
*Assistant Examiner*—Vasu S. Jagannathan
*Attorney, Agent, or Firm*—Antonelli, Terry, Stout & Kraus

[57] ABSTRACT

An impact modifier obtained by emulsion polymerizing acrylic monomer(s), etc., in the presence of a conjugated diene rubber to give a graft rubber polymer, or obtained by polymerizing acrylic monomer(s) and the like ethylenically unsaturated monomers in the presence of the graft rubber polymer, is effective for improving impact resistance and weathering resistance of molded articles obtained from thermoplastic resin compositions containing such an impact modifier.

6 Claims, 5 Drawing Sheets

2 μm

2 μm

2μm

1 μm

2 μm

IMPACT MODIFIER, THERMOPLASTIC RESIN COMPOSITION USING THE SAME AND MOLDED ARTICLE OBTAINED THEREFROM

BACKGROUND OF THE INVENTION

This invention relates to an impact modifier for thermoplastic resins, a thermoplastic resin composition using the same, and an molded article obtained therefrom.

Heretofore, in order to improve impact resistance of thermoplastic resin compositions, there have been compounded conjugated diene rubber graft copolymers (e.g. MBS resin, ABS resin).

For example, vinyl chloride type resins are widely used for their advantages in flame retardancy, chemical resistance, etc. But the vinyl chloride type resins have a defect in that the resins by themselves are poor in impact resistance. Thus, the vinyl chloride type resins are compounded with impact modifiers. But even if a methyl methacrylate resin, MBS resin or ABS resin is simply mixed with a commercially available vinyl chloride type resin, the resulting molded article is not sufficient in impact resistance due to poor dispersibility of individual components.

In order to overcome this defect, it is proposed to use a graft copolymer of conjugated diene rubber with a methyl methacrylate copolymer obtained by suspension polymerization and having a suitable reduced viscosity (e.g. Japanese Patent Unexamined Publication Nos. 60-161450 and 61-14246). But since such a conjugated diene rubber component has many double bonds which are chemically unstable in the main chain, the graft copolymer is readily deteriorated by ultraviolet rays, which results in making the outdoor practical use impossible due to poor weathering resistance such as lowering in strength, causing discoloration, and the like.

In order to improve the weathering resistance, it is proposed to use a methyl methacrylate series polymer and a graft copolymer obtained by grafting an acrylic acid alkyl ester, a methacrylic acid alkyl ester, an aromatic vinyl compound, a vinyl cyanide compound, and the like in the presence of an acrylic rubber containing almost no double bonds in the main chain (Japanese Patent Unexamined Publication No. 59-98153). But according to this proposal, the weathering resistance can be improved to some extent, but there arises a problem of lowering impact resistance.

The methyl methacrylate series polymer used in the above proposal is excellent in weathering resistance but is poor in flame retardancy, impact resistance, chemical resistance and solvent resistance. Thus, when the methyl methacrylate series polymer is mixed with a vinyl chloride series resin, inherent properties of the vinyl chloride series resin are damaged.

As mentioned above, it was impossible to provide thermoplastic resin compositions well balanced in properties such as impact resistance, weathering resistance, etc.

SUMMARY OF THE INVENTION

It is an object of the present invention to provide an impact modifier for thermoplastic resins such as vinyl chloride type resins for imparting excellent impact resistance and weathering resistance while maintaining inherent good properties such as flame retardancy, chemical resistance, and the like. It is another object of the present invention to provide a thermoplastic resin using such an impact modifier and a molded article obtained therefrom.

The present invention provides an impact modifier of a graft rubber polymer (A) obtained by emulsion polymerizing
(a) 99 to 20 parts by weight of a polymerizable monomer mixture comprising
(I) 0.1 to 20% by weight of a polyfunctional monomer,
(II) 50 to 99.9% by weight of an acrylic acid alkyl ester, the alkyl moiety thereof having 1 to 13 carbon atoms, and
(III) 0 to 30% by weight of a copolymerizable vinyl compound other than those mentioned above,
in the presence of
(b) 1 to 80 parts by weight of a conjugated diene rubber, a total of the components (a) and (b) being 100 parts by weight.

The present invention also provides an impact modifier of a graft copolymer (C) obtained by polymerizing
(B) 40% by weight or less and more than 0% by weight of one or more monomers comprising
(IV) 0 to 100% by weight of an acrylic acid alkyl ester,
(V) 0 to 100% by weight of an aromatic vinyl compound,
(VI) 0 to 100% by weight of a methacrylic acid alkyl ester, and
(VII) 0 to 40% by weight of a vinyl cyanide compound,
in the presence of 60% by weight or more and less than 100% by weight of the graft rubber polymer (A) mentioned above.

The present invention further provides an impact modifier of a graft copolymer (C) obtained by (i) emulsion polymerizing
(a) 99 to 20 parts by weight of a polymerizable monomer mixture comprising
(I) 0.1 to 20% by weight of a polyfunctional monomer,
(II) 50 to 99.9% by weight of an acrylic acid alkyl ester, the alkyl moiety thereof having 1 to 13 carbon atoms, and
(III) 0 to 30% by weight of a copolymerizable vinyl compound other than those mentioned above,
in the presence of
(b) 1 to 80 parts by weight of a conjugated diene rubber, a total of the components (a) and (b) being 100 parts by weight, to a conversion of 50 to 93% by weight to give a graft rubber polymer (A) containing unreacted polymerizable monomers, and (ii) polymerizing
(B) 40 parts by weight or less and more than 0 part by weight of one or more monomers comprising
(IV) 0 to 100% by weight of an acrylic acid alkyl ester,
(V) 0 to 100% by weight of an aromatic vinyl compound,
(VI) 0 to 100% by weight of a methacrylic acid alkyl ester, and
(VII) 0 to 40% by weight of a vinyl cyanide compound,
in the presence of 60 parts by weight or more and less than 100 parts by weight of the graft rubber polymer (A), a total of the monomers (B) and the graft rubber polymer (A) being 100 parts by weight (the impact modifier of the graft copolymer (C) being particles having the conjugated diene rubber component as a nucleus and the acrylic rubber component obtained from the component (a) as an outer shell, from the viewpoint of a structure).

The present invention still further provides a thermoplastic resin composition comprising such an impact modifier and a thermoplastic resin.

The present invention also provides a molded article obtained by molding such a thermoplastic resin composition.

DESCRIPTION OF THE PREFERRED EMBODIMENTS

Figure 1:
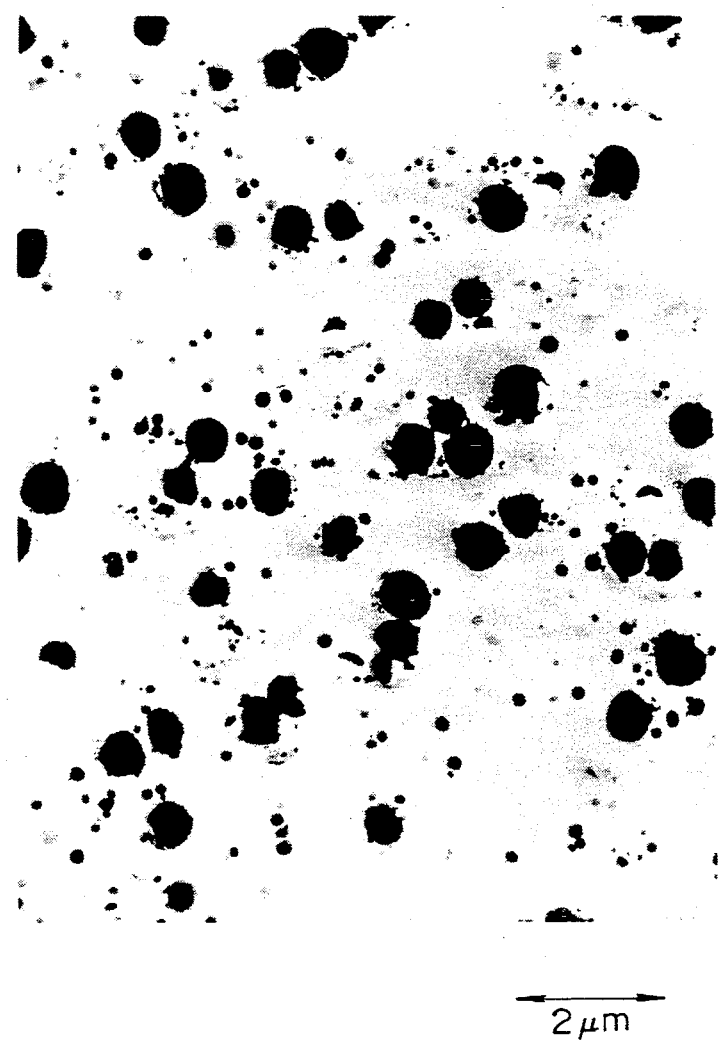
FIG. 1 is an electron microscope photograph with magnification of 10,000 of a $OsO_4$ stained ultrathin film sample showing a structure of a molded article wherein one example of impact modifier particles of the present invention are dispersed in a matrix vinyl chloride resin.

The impact modifier of graft rubber polymer (A) is explained below.

The graft rubber polymer (A) is obtained by using as a nucleus a conjugated diene rubber (b) having excellent properties as rubber and emulsion graft polymerizing thereonto an acrylic acid alkyl ester (II) and a polyfunctional monomer (I) as a crosslinking agent, each as an essential component. The graft rubber polymer (A) is effective for remarkably improving impact resistance.

As the conjugated diene rubber (b), there can be used polybutadiene, a butadiene-styrene copolymer, a butadiene-acrylonitrile copolymer, etc.

The polymerizable monomer mixture (a) comprises (I) a polyfunctional monomer, (II) an acrylic acid alkyl ester wherein the alkyl moiety has 1 to 13 carbon atoms, and (III) a vinyl compound copolymerizable with the components (I) and (II).

The polyfunctional monomer (I) is used in the polymerizable monomer mixture (a) in an amount of 0.1 to 20% by weight, preferably 0.5 to 10% by weight, more preferably 1 to 5% by weight. When the amount is less than 0.1% by weight, the degree of crosslinking becomes insufficient, and impact resistance and surface appearance of molded articles become poor. On the other hand, when the amount is more than 20% by weight, the degree of crosslinking becomes in excess and the impact resistance is lowered.

As the polyfunctional monomer (I), there can be used divinyl benzene, dialkyl phthalate, triallyl isocyanurate, triallyl cyanurate, dicyclopentadiene acrylate, dicyclopentadiene methacrylate, 1,3,5-triacryloylhexahydro-s-triazine, etc., alone or as a mixture thereof. The use of the first six compounds are particularly preferable for providing excellent impact resistance and other properties.

As the acrylic acid alkyl ester (II) wherein the alkyl moiety thereof having 1 to 13 carbon atoms, there can be used methyl acrylate, ethyl acrylate, propyl acrylate, butyl acrylate, pentyl acrylate, hexyl acrylate, heptyl acrylate, octyl acrylate, 2-ethylhexyl acrylate, nonyl acrylate, decyl acrylate, undecyl acrylate, dodecyl acrylate, tridecyl acrylate etc., alone or as a mixture thereof. Among them, the use of butyl acrylate is particularly preferable.

The acrylic acid alkyl ester (II) is used in the polymerizable monomer mixture (a) in an amount of 50 to 99.9% by weight, preferably 65 to 99.5% by weight. When the amount is less than 50% by weight, properties of the acrylic rubber is lowered, while when the amount is more than 99.9% by weight, the impact resistance is lowered.

As the vinyl compound (III) copolymerizable with the polyfunctional monomer (I) and the acrylic acid alkyl ester (II), there can be used acrylonitrile, methyl methacrylate, ethyl methacrylate, methacrylonitrile, styrene, etc., alone or as a mixture thereof.

The vinyl compound (III) is used in the polymerizable monomer mixture (a) in an amount of 0 to 30% by weight, preferably 0 to 25% by weight. When the amount is more than 30% by weight, properties as acrylic rubber cannot be obtained sufficiently by the polymerization of the polymerizable monomer mixture (a).

The conjugated diene rubber (b) is used in an amount of 1 to 80 parts by weight, preferably 5 to 45 parts by weight, more preferably 20 to 45 parts by weight, based on 100 parts by weight of the conjugated diene rubber (b) and the component (a) for obtaining the graft rubber polymer (A). When the amount is less than 1 part by weight, the impact resistance becomes insufficient. On the other hand, when the amount is more than 80 parts by weight, weathering resistance is lowered.

For obtaining the graft rubber copolymer (A), it is preferable to use the conjugated diene rubber (b) in the form of a latex obtained by previously dispersing it in an aqueous medium in order to make the dispersion easy at the time of emulsion polymerization. As the emulsion polymerization method, there can be used conventionally used ones using an emulsifier and a polymerization initiator.

As the emulsifier used in the emulsion polymerization for obtaining the graft rubber polymer (A), there can be used anionic emulsifiers such as sodium oleate, sodium lauryl sulfate, sodium dodecylbenzene sulfonate, potassium oleate, etc.; nonionic emulsifiers such as polyoxyethylene methyl ether, etc; rosined soap, etc.

The emulsifier is used preferably in an amount of 0.5 to 1.5% by weight based on the total weight of the components (a) and (b).

As the polymerization initiator, there can be used conventionally used ones such as azo compounds e.g. 2,2'-azobisisobutyronitrile; persulfates e.g. potassium persulfate, ammonium persulfate, etc.; organic peroxides e.g. t-butyl peroxy maleic acid, cumene hydroperoxide, t-butyl hydroperoxide, diisopropylbenzene hydroperoxide, p-menthane hydroperoxide, 1,1,3,3-tetramethyl butylhydroperoxide, etc.; inorganic peroxides e.g. hydrogen peroxide; and redox systems e.g. a peroxide mentioned above/sodium formaldehyde sulfoxylate, a peroxide mentioned above/sodium formaldehyde sulfoxylate/ferrous sulfate/ethylenediaminetetraacetic acid.disodium salt, a peroxide mentioned above/dextrose/sodium pyrophosphate/ferrous sulfate, etc. The polymerization initiator is used in an amount of preferably 0.02 to 5% by weight based on the weight of the component (a).

The graft rubber polymer (A) per se can be used as an impact modifier. In order to obtain more effective impact modifier, the graft rubber polymer (A) is further used for polymerization to give the graft copolymer (C). That is, the graft copolymer (C) is obtained by polymerizing (B) one or more monomers comprising (IV) 0 to 100% by weight of an acrylic acid alkyl ester, (V) 0 to 100% by weight of an aromatic vinyl compound, (VI) 0 to 100% by weight of a methacrylic acid alkyl ester, and (VII) 0 to 40% by weight of a vinyl cyanide compound, the monomers (B) being in an amount of 40% by weight or less and more than 0% by weight, in the presence of 60% by weight or more and less than 100% by weight of the graft rubber polymer (A).

More preferable graft copolymer (C) can be obtained by stopping the polymerization of graft rubber polymer (A) before a conversion of 100%, preferably at a conversion of 50 to 93%, more preferably at a conversion of 60 to 90%, while retaining unreacted polymerizable monomers in the graft rubber polymer (A), followed by mixing with one or more monomers (B) and polymerization.

The conversion can be determined by sampling a polymerization reaction solution, adding a polymerization inhibitor thereto, removing a volatile component using an infrared moisture meter, measuring the weight of a non-volatile component, and calculating the ratio of the weight of non-volatile component to the charging amounts of raw materials. The unit of conversion is a percent by weight.

As the acrylic acid alkyl ester (IV), there can be used the same acrylic acid alkyl ester (II) having as the alkyl moiety 1 to 13 carbon atoms as mentioned above.

As the aromatic vinyl compound (V), there can be used styrene, α-substituted styrenes such as α-methyl styrene, α-ethyl styrene, etc., substituted styrenes such as chlorostyrene, vinyltoluene, t-butylstyrene, etc.

As the vinyl cyanide compound (VII), there can be used acrylonitrile, methacrylonitrile, etc.

As the methacrylic acid alkyl ester (VI), there can be used methyl methacrylate, ethyl methacrylate, butyl methacrylate, etc.

As the monomer(s) (B), when the amount of the vinyl cyanide compound (VII) is too much, there is a tendency to lower moldability. Therefore, it is preferable to use the vinyl cyanide compound (VII) in an amount of 40% by weight or less.

As the monomers (B), the use of methyl methacrylate, acrylonitrile and styrene is preferable. Above all, the combined use of acrylonitrile and styrene is particularly preferable from the viewpoint of balance of impact resistance and rigidity of molded articles. Acrylonitrile is preferably used in an amount of 20 to 40 parts by weight, while styrene is used in an amount of 80 to 60 parts by weight, a total of the two being 100 parts by weight.

In the production of the graft copolymer (C), the graft rubber polymer (A) is used in an amount of 60% by weight or more and less than 100% by weight, preferably 99% by weight or less, and the monomers (B) are used in amounts of 40% by weight or less and more than 0% by weight, preferably 1% by weight or more. When the weight ratio (A)/(B) is less than 60/40, the impact resistance is lowered, while when the weight ratio is more than 99/1, there is a tendency to lower the impact resistance. On the other hand, when the compounding amount of the impact modifier increases in order to compensate the lowering of impact resistance, inherent good properties of the matrix resin are damaged.

The polymerization of monomers (B) in the presence of the graft rubber polymer (A) can be carried out either by polymerizing the whole amounts at one time, or by polymerizing in several times separately, or by polymerizing the whole amounts while adding dropwise. A preferable method is to polymerize 5 to 30% by weight of the monomers (B) in the first stage, and to polymerize the rest of the monomers (B) in the second stage. The compositions of the monomers (B) to be added separately preferably contain not more than 40% by weight of the vinyl cyanide compound. By employing the two-stage polymerization method mentioned above, a resin having further higher impact resistance can be obtained.

The polymerization method for obtaining the graft copolymer (C) is not limited to a special method and any conventional methods can be used. But considering the polymerization method for obtaining the graft rubber polymer (A), an emulsion polymerization method is preferable.

The graft rubber polymer (A) and the graft copolymer (C) can be coagulated by using a salting-out method, filtered, and died to give the desired impact modifiers, which are blended with other thermoplastic resins.

The obtained impact modifiers are in the form of particles having a shell-core structure wherein the diene rubber component imparting impact resistance forms a core, the acrylic rubber component obtained from the component (a) imparting weathering resistance forms an outer shell, and if necessary, graft chains of a polymer of ethylenically unsaturated monomer(s) (B) imparting rigidity form a second outer shell. Therefore, there can be obtained very excellent impact resistance which has not been obtained by known impact modifiers.

As the thermoplastic resins to be blended with the impact modifiers of the present invention, there can be used conventional resins, for example, vinyl chloride type resins such as polyvinyl chloride, polyvinyl chloride-containing resins, e.g. ethylene-vinyl chloride copolymer, vinyl chloride-vinyl acetate copolymer, etc., poly(methyl methacrylate), polypropylene, polyethylene terephthalate, polybutylene terephthalate, polycarbonate, polyamides such as polycaprolactam, polyhexamethylene adipate, etc., sytreneacrylonitrile copolymer resin, polyvinylidene dichloride, polyvinylidene fluoride, polyester carbonate, polysulfone, polyphenylene sulfide, etc.

Among them, the impact modifiers of the present invention are effective for improving impact resistance of vinyl chloride type resins containing the vinyl chloride moiety in an amount of 80% by weight or more.

The compounding amount of the impact modifier in a thermoplastic resin composition is usually 40 to 5% by weight, preferably 20 to 5% by weight, more preferably 15 to 6% by weight. When the amount of the impact modifier is more than 40% by weight, there is a tendency to lower inherent good properties of the thermoplastic resin to be blended and in such a case, the impact modifier forms a continuous phase, resulting in rather lowering impact resistance. On the other hand, when the amount is less than 5% by weight, effects for improving the impact resistance and weathering resistance are lessened.

Blending of the impact modifier and a thermoplastic resin can be carried out, for example, by mixing both powders using a Henschel-type mixer, followed by melt kneading.

As mentioned above, the impact modifiers of the present invention are particularly useful for improving impact resistance and other properties of vinyl chloride type resins.

The vinyl chloride type resins include a homopolymer of vinyl chloride and copolymers of vinyl chloride and other monomer(s) copolymerizable therewith. Good properties can be obtained in the case of homopolymer of vinyl chloride. In the case of copolymers of vinyl chloride, the content of vinyl chloride of 80% by weight or more (copolymerizable monomer content being 20% by weight or less) is preferable from the viewpoints of flame retardancy and fluidity. These homopolymer and copolymers can be used alone or as a mixture thereof.

The monomer component copolymerizable with vinyl chloride includes, for example, vinyl acetate, ethylene, propylene, etc. The use of vinyl acetate, ethylene and/or propylene is preferable from the viewpoint of flame retardancy.

The vinyl chloride type resins can be produced by conventional methods such as suspension polymerization, emulsion polymerization, etc. It is also possible to use commercially available vinyl chloride type resins such as Ryuron P.V.C. 7000, Ryuron P.V.C. 800 BL, Ryuron P.V.C. 800BK, Ryuron E-430, Ryuron E-650, Ryuron E-800, and Ryuron E-1050 (mfd. by Tosoh Corp.), TK-700, TK-800, TK-1000, TK-1300, TK-1400, SG-400G, SC-500T, MA-800S, MC-700 (mfd. by Shin-Etsu Chemical Co., Ltd.), etc.

Vinyl chloride type resins having an average degree of polymerization of 400 to 1300 according to JIS K-6721 are preferable from the viewpoint of molding. Further, the impact modifiers of the present invention are also effective for vinyl chloride type resins having an average degree of polymerization of 1700 to 4500 and usually used by mixing with a plasticiser (semi-rigid and flexible polyvinyl chloride), and particularly effective for improving impact resistance at low temperatures. In such a case, a plasticizer such as dioctyl adipate, dioctyl phthalate, or the like is used together.

A thermoplastic resin composition, e.g. a vinyl chloride type resin composition, can be obtained by mixing a vinyl chloride type resin and an impact modifier of the present invention preferably in amounts mentioned above. The thermoplastic resin composition, e.g. the vinyl chloride type resin composition may further contain one or more thermal stabilizers, light stabilizers, antioxidants, ultraviolet absorbers, lubricants, fillers, pigments, processing aids, plasticizers, etc., depending on purposes. The kinds and amounts of these additives can be selected properly according to conventional methods.

The thermoplastic resin compositions such as vinyl chloride type resin compositions can be molded into sheets, plates, and the like molded articles by compression molding, injection, extrusion, casting, calendering, etc. Since the molded articles are excellent in weathering resistance, they can be used as house-building parts and materials for outdoor or indoor uses, furniture, containers, and the like.

The molded articles obtained from the thermoplastic resin compositions of the present invention has a structure wherein particles of the impact modifier are dispersed in the matrix thermoplastic resin, so that good properties are exhibited by such a structure.

The present invention is illustrated by way of the following Examples, in which all parts and percents are by weight, unless otherwise specified.

EXAMPLE 1

(1) Production of Impact Modifier [Graft Rubber Polymer (A-1)]

In a 4-liter reactor equipped with a stirrer, 5.0 parts of potassium oleate was dissolved in 240 parts of deionized water at 30° to 35° C. Then, 30 parts (solid weight) of butadiene rubber latex (SN-800 T, a trade name, mfd. by Sumitomo Naugatuck Co., Ltd.) was mixed therewith. Then, 1.4 parts of triallyl isocyanurate and 70 parts of butyl acrylate were added to the reactor with stirring to give an emulsion. Dissolved oxygen in the emulsion was replaced by nitrogen for about 1 hour with stirring until oxygen content became 2 ppm or less (measured by a Universal Oxygen Analyzer, mfd. by Oriental Electric Co., Ltd.). During nitrogen replacement, there were prepared two containers, one of which were placed 0.04 part of potassium persulfate and 10 parts of deionized water and dissolved, and another of which were placed 0.004 part of sodium sulfite and 10 parts of deionized water and dissolved. After the dissolved oxygen content in the emulsion became 2 ppm or less, the above-mentioned two aqueous solutions were added to the emulsion, followed by temperature rise to 60° to 65° C. with stirring.

The polymerization was carried out at 60° to 65° C. for 3 to 4 hours. Then, the same aqueous solution of potassium persulfate as mentioned above was added to the polymerization system, followed by 2 hours' polymerization at 85° to 90° C. until conversion of more than 95% to substantially complete the polymerization and to give a latex of graft copolymer.

After cooling the latex, the latex was added dropwise to an aqueous solution obtained by dissolving 10 parts of potassium alum in 500 parts of deionized water for salting-out, followed by filtering and drying to give a powder of graft rubber polymer (A-1).

(2) Production of Vinyl Chloride Resin Composition

Vinyl chloride-ethylene copolymer having an average degree of polymerization of 650 (Ryuron E-650, a trade name, mfd. by Tosoh Corp.) in an amount of 90 parts, 10 parts of the graft rubber polymer (A-1) obtained in above (1) as an impact modifier, 3 parts of dibutyl tin maleate as a stabilizer, and 2 parts of calcium stearate melt kneaded in a single screw extruder having a diameter of 40 mm (mfd. by Thermoplastic Industry Co., Ltd.) to give pellets. The cylinder and dice temperatures of the extruder were in the range of 150° to 180° C.

(3) Evaluation Method

The pellets produced in above (2) were injection molded into test pieces for test using an in-line screw type injection molding machine (SJ-25/35 type, mfd. by Meiki Co., Ltd.) with a cylinder temperature of 180° to 190° C. and a mold temperature of 50° to 55° C. The test pieces were subjected to measurements of Izod impact strength and weathering resistance.

The results are shown in Table 1.

Weathering resistance was measured using a sunshine weather meter by accelerated weathering test according to JIS A1415 and evaluated by a color difference ΔE after 1000 hours according to JIS A1411.

Izod impact strength was measured according to ASTM D256.

As is clear from Table 1, the molded article obtained in Example 1 showed Izod impact strength of 957 J/m at 23° C. and ΔE of 5 to 7. Thus, impact resistance and weathering resistance were excellent.

EXAMPLES 2 TO 4

Using the graft rubber polymer (A-1) produced in Example 1 as an impact modifier, vinyl chloride resin compositions were prepared with mixing amounts shown in Table 1. Test pieces were molded and subjected to the tests in the same manner as described in Example 1. The results are shown in Table 1.

EXAMPLES 5 AND 6

Graft rubber polymer (A-2) was prepared in the same manner as described in Example 1 except for using the butadiene latex in an amount of 40 parts in place of 30 parts and butyl acrylate in an amount of 60 parts in place of 70 parts. Using the graft rubber polymer (A-2), vinyl chloride resin compositions were prepared with the mixing ratios as shown in Table 1.

Test pieces for measuring were prepared and subjected to evaluation of impact resistance and weathering resistance in the same manner as described in Example 1. The results are shown in Table 1.

EXAMPLES 7 AND 8

Graft rubber polymer (A-3) was prepared in the same manner as described in Example 1 except for using the butadiene latex in an amount of 20 parts in place of 30 parts and butyl acrylate in an amount of 80 parts in place of 70 parts. Using the graft rubber polymer (A-3), vinyl chloride resin compositions were prepared with the mixing ratios as shown in Table 1.

Test pieces for measuring were prepared and subjected to evaluation of impact resistance and weathering resistance in the same manner as described in Example 1. The results are shown in Table 1.

COMPARATIVE EXAMPLE 1

Test pieces were prepared in the same manner as described in Example 1 except for not using the graft rubber polymer (A-1) (i.e. using only Ryuron E-650). Impact resistance and weathering resistance were measured in the same manner as described in Example 1. The results are shown in Table 1.

As shown in Table 1, Izod impact strength is 38 J/m at 23° C. and ΔE is 30 or more. This means that the molded article of vinyl chloride resin alone is considerably inferior in impact resistance and weathering resistance to those of vinyl chloride resin compositions mixed with a graft rubber polymer (A).

EXAMPLE 9

Test pieces were prepared by using a vinyl chloride resin composition as listed in Table 1 containing the graft rubber polymer (A-1) obtained in Example 1. Impact resistance and weathering resistance were measured in the same manner as described in Example 1. The results are shown in Table 1.

As shown in Table 1, Izod impact strength is 187 J/m at 23° C. and ΔE is 9 to 11. This means that when the proportion of the graft rubber polymer increases, there is a tendency to lower impact resistance due to formation of a continuous phase.

COMPARATIVE EXAMPLES 2 AND 3

Rubber containing butyl acrylate as a major component was produced in the same manner as described in Example 1 except for not using the butadiene rubber. Vinyl chloride resin compositions were prepared by using the resulting rubber in place of the graft rubber polymer (A) in the same manner as described in Example 1.

Test pieces were prepared and subjected to evaluation of impact resistance and weathering resistance in the same manner as described in Example 1. The results are shown in Table 1.

As is clear from Table 1, when the butyl acrylate rubber is used in place of the graft rubber polymer (A), the weathering resistance is almost the same (ΔE being 8 to 10), but Izod impact strength (170 J/m or less) is poor.

COMPARATIVE EXAMPLES 4 AND 5

Butadiene rubber (SN-800T, mfd. by Sumitomo Naugatuck Co., ltd.) was used in place of the graft rubber polymer (A) to give vinyl chloride resin compositions. Impact resistance and weathering resistance were measured in the same manner as described in Example 1 and listed in Table 1.

As is clear from Table 1, the Izod impact strength is as considerably low as about 40 J/m. This seems to be derived from incompatibility between the butadiene rubber and vinyl chloride resin. Further, the weathering resistance (ΔE=30 or more) is considerably poor.

TABLE 1

| Example No. | Vinyl chloride resin composition | | Izod impact strength (J/m) | Weathering resistance ΔE |
|---|---|---|---|---|
| | Vinyl chloride resin (Ryuron E-650) (parts) | Impact modifier (Graft rubber polymer (A)) (parts) | | |
| Example 1 | 90 | A-1  10 | 957 | 5~7 |
| Example 2 | 80 | A-1  20 | 1205 | 5~7 |
| Example 3 | 60 | A-1  40 | 962 | 7~8 |
| Example 4 | 95 | A-1  5 | 273 | 7~8 |
| Example 5 | 90 | A-2  10 | 705 | 7~9 |
| Example 6 | 80 | A-2  20 | 950 | 8~10 |
| Example 7 | 90 | A-3  10 | 836 | 5~7 |
| Example 8 | 80 | A-3  20 | 1037 | 5~7 |
| Example 9 | 50 | A-1  50 | 187 | 9~11 |
| Comparative Example 1 | 100 | 0 | 38 | 30 or more |
| Comparative Example 2 | 90 | 10 | 111 | 8~10 |
| Comparative Example 3 | 80 | 20 | 162 | 8~10 |
| Comparative Example 4 | 90 | 10 | 39 | 30 or more |
| Comparative Example 5 | 80 | 20 | 42 | 30 or more |

EXAMPLES 10 TO 12, COMPARATIVE EXAMPLE 6

(1) Production of Graft Rubber Polymer Latex (A)

In a 4-liter reactor equipped with a stirrer, 1324 g of butadiene rubber latex (solid content 34%, UB-1001S, mfd. by Nippon Zeon Co., Ltd.) and 11.6 g of semi-hardened tallow fatty acid potassium salt (KS Soap, mfd. by Kao Corp.) dissolved in 1060 g of deionized water, 1050 g of butyl acrylate and 21 g of triallyl isocyanurate were placed and mixed uniformly to give an emulsion. Nitrogen was introduced into the emulsion with stirring for about 1.5 hours until the dissolved oxygen content became 2 ppm or less. After adding an aqueous solution dissolving 0.5 g of potassium persulfate in 50 g of pure water and an aqueous solution dissolving 0.5 g of sodium sulfite in 50 g of pure water to the emulsion, the temperature was raised to 60° C. The polymerization was carried out at 60° C. for 4.5 hours to substantially complete the polymerization at the conversion of 98% and to give a graft rubber polymer latex (A).

(2) Production of Graft Copolymer (C-1)

In a 4-liter flask equipped with a stirrer, 2332 g of the graft rubber polymer latex (A) obtained in above (1) (solid content 42%), 20.2 g of acrylonitrile, 40.8 g of styrene, 0.22 g of cumene hydroperoxide, 1.2 g of sodium lauryl sulfate (Emal 2F, mfd. by Kao Corp.), 6.0 g of semi-hardened tallow fatty acid potassium salt (KS Soap, mfd. by Kao Corp.) and 340 g of pure water were placed and mixed uniformly. After introducing nitrogen into the emulsion for about 1.5 hours until the dissolved oxygen content became 2 ppm or less, 1.0 g of sodium formaldehyde sulfoxylate (Rongalite SFS, mfd. by Sumitomo Chemical Co., Ltd.) and 60 g of pure water were added thereto and the temperature was raised to 65° C. After 1.5 hours while maintaining the temperature at 65° C., 5.1 g of potassium carbonate and 100 g of pure water were added, followed by dropwise addition of uniformly mixed solution of 4.2 g of KS Soap, 23.5 g of deionized water, 51.9 g of acrylonitrile, 120 g of styrene, 0.6 g of cumene hydroperoxide and 0.65 g of t-dodecyl mercaptane for about 1.5 hours. After the dropwise addition, stirring was continued for about 3 hours. Then, an aqueous solution of potassium persulfate (KPS) was added and the polymerization was carried out at 75° C. for about 1 hour to give a graft copolymer latex with a conversion of 97% or more. After cooling to room temperature, an aqueous solution of polyvinyl alcohol was added to the graft copolymer latex with stirring for demulsifying. After repeating dehydration and washing, and drying, a powder of impact modifier was obtained.

(3) Production of Vinyl Chloride Resin Composition

To 100 parts of vinyl chloride resin having an average degree of polymerization of 1050 (homopolymer of vinyl chloride, TK-1000, mfd. by Shin-Etsu Chemical Co., Ltd.), the impact modifier obtained above in amounts as shown in Table 2, 3 parts of dibutyl tin maleate as a stabilizer and a mixture of 1 part of polyethylene wax and 0.5 part of calcium stearate were added and roll kneaded at 170° C., followed by press molding at 190° C. to give test pieces.

Various tests were carried out and listed in Table 2.

TABLE 2

| Example No. | Comparative Example 6 | Example | | |
|---|---|---|---|---|
| | | 10 | 11 | 12 |
| Amount of impact modifier (parts) | 0 | 6 | 8 | 10 |
| Izod impact strength (J/m) | 46 | 350 | 1090 | 1130 |

TABLE 2-continued

| Example No. | Comparative Example 6 | Example | | |
|---|---|---|---|---|
| | | 10 | 11 | 12 |
| Tensile strength *1 (MPa) | 54 | 50 | 40 | 43 |
| Flexural modulus *2 (MPa) | 2760 | 2500 | 2300 | 2180 |
| Vicat softening *3 temperature (°C.) | 92.8 | 93.3 | 93.9 | 95.2 |

Note)
*1: JIS K7113
*2: ASTM D790
*3: JIS K7206

EXAMPLES 13 TO 15, COMPARATIVE EXAMPLE 7

To 100 parts of vinyl chloride resin having an average degree of polymerization of 800 (homopolymer of vinyl chloride, TK-800, mfd. by Shin-Etsu Chemical Co., Ltd.), the impact modifier obtained in Example 10 in amounts as shown in Table 3, 1 part of tribasic lead sulfate, 0.5 part of dibasic lead stearate, 2 parts of lead stearate, 0.3 part of barium stearate, and 0.2 part of calcium stearate were added, melt kneaded at 170° C., and press molded at 190° C. to give test pieces from resin plates.

Properties were evaluated in the same manner as described in Example 10. The results are shown in Table 3.

TABLE 3

| Example No. | Comparative Example 7 | Example | | |
|---|---|---|---|---|
| | | 13 | 14 | 15 |
| Amount of impact modifier (parts) | 0 | 6 | 8 | 10 |
| Izod impact strength (J/m) | 86 | 420 | 1060 | 1080 |
| Tensile strength (MPa) | 54 | 45 | 44 | 43 |
| Flexural modulus (MPa) | 2770 | 2310 | 2290 | 2260 |
| Vicat softening temperature (°C.) | 95.0 | 92.8 | 92.9 | 92.3 |

EXAMPLE 16

(1) Production of Graft Rubber Polymer Latex (A)

In a 4-liter reactor equipped with a stirrer, the following butadiene rubber latex ①, emulsifier ② and monomers ③ were placed and mixed uniformly to give an emulsion. After making the dissolved oxygen content in the emulsion 2 ppm or less by introducing nitrogen thereinto for about 1.5 hours, the following polymerization initiator ④ and auxiliary ⑤ were added and the temperature was raised to 60° C. After about 1.5 hours while maintaining the temperature at 60° C., the same aqueous solution of potassium persulfate as the component ④ was added thereto and the polymerization was carried out at 60° C. for further 3 hours. When the conversion became more than 95%, the polymerization was completed substantially to give a graft rubber polymer latex (A).

| Component ① | Butadiene rubber latex (UB-1001S, mfd. by Nippon Zeon Co., Ltd., solid content 34%) | 1324 g |
|---|---|---|
| Component ② | Semi-hardened tallow | 11.6 g |

-continued

| | | |
|---|---|---|
| | fatty acid potassium salt (KS Soap, mfd. by Kao Corp.) | |
| | Pure water | 1060 g |
| Component ② | Butyl acrylate | 1050 g |
| | Triallyl isocyanurate | 21 g |
| Component ④ | Potassium persulfate | 0.5 g |
| | Pure water | 50 g |
| Component ⑤ | Sodium sulfite | 0.13 g |
| | Pure water | 50 g |

(2) Production of Graft Polymer (C)

In a 4-liter flask equipped with a stirrer, the graft rubber polymer latex ① (solid content 40%) obtained in above (1), the following emulsifier ② and grafting component (monomers) ③ were placed and mixed uniformly to give an emulsion. After making the dissolved oxygen content in the emulsion 2 ppm or less by introducing nitrogen thereinto for about 1.5 hours, the following polymerization initiating auxiliary ④ was added thereto, and the temperature was raised to 65° C. After 1.5 hours while maintaining the temperature at 65° C., the following component ⑤ was added, followed by dropwise addition of a uniformly emulsified mixed solution of the following component ⑥ and component ⑦ in about 1.5 hours After the dropwise addition, stirring was continued for further 3 hours, followed by addition of the following component ⑧. After polymerizing at 75° C. for 1 hour, the polymerization was substantially completed at a conversion of 97% or more to give a graft copolymer latex (C). After cooling to room temperature, an aqueous solution of polyvinyl alcohol was added to the graft copolymer latex with stirring for demulsifying. After repeating dehydration and washing, and drying, there was obtained a powder of impact modifier (graft copolymer).

| | | |
|---|---|---|
| Component ① | Graft rubber polymer latex | 2700 g |
| Component ② | Sodium lauryl sulfate | 1.2 g |
| | Potassium oleate | 6.0 g |
| | Pure water | 340 g |
| Component ③ | Acrylonitrile | 10.1 g |
| | Styrene | 20.4 g |
| | Cumene hydroperoxide | 0.11 g |
| Component ④ | Sodium formaldehyde sulfoxylate | 1.03 g |
| | Pure water | 60 g |
| Component ⑤ | Potassium carbonate | 5.26 g |
| | Pure water | 100 g |
| Component ⑥ | Potassium oleate | 2.1 g |
| | Pure water | 117.5 g |
| Component ⑦ | Acrylonitrile | 26.0 g |
| | Styrene | 60.0 g |
| | Cumene hydroperoxide | 0.30 g |
| | t-Dodecyl mercaptan | 0.33 g |
| Component ⑧ | Potassium persulfate | 2.5 g |
| | Pure water | 100 g |

The resulting impact modifier in an amount of 8 parts was mixed with 100 parts of vinyl chloride homopolymer having an average degree of polymerization of 1050 (TK-1000, mfd. by Shin-Etsu Chemical Co., Ltd.), followed by melt kneading with a mixture comprising 1 part of tribasic lead sulfate, 0.5 part of dibasic lead stearate, 2 parts of lead stearate, 0.3 part of barium stearate and 0.2 part of calcium stearate. A resin plate was obtained by press molding at 190° C., and subjected to Izod impact test. The Izod impact strength (notched) was 1080 J/m, which value was remarkably high compared with the value of 86 J/m containing no impact modifier.

EXAMPLE 17

A graft copolymer latex was obtained in the same manner as described in Example 16 (2) except for using the following components ①, ③, ⑥ and ⑦.

| | | |
|---|---|---|
| Component ① | Graft rubber polymer latex | 1748 g |
| Component ③ | Acrylonitrile | 40.4 g |
| | Styrene | 81.6 g |
| | Cumene hydroperoxide | 0.43 g |
| Component ⑥ | Potassium oleate | 8.3 g |
| | Pure water | 470 g |
| Component ⑦ | Acrylonitrile | 103.7 g |
| | Styrene | 240.1 g |
| | Cumene hydroperoxide | 1.2 g |
| | t-Dodecyl mercaptan | 1.31 g |

The resulting latex was subjected to demulsification, followed by dehydration, washing and drying to give a powder of impact modifier.

The obtained impact modifier in an amount of 15 parts was added to 100 parts of homopolymer of vinyl chloride having an average degree of polymerization of 1050 (TK-1000, mfd. by Shin-Etsu Chemical Co., Ltd.), followed by melt mixing with a mixture comprising 3 parts of dibutyl tin maleate as a stabilizer, 0.5 parts of calcium stearate and 0.5 part of stearyl stearate in the same manner as described in Example 16(2). A test piece was obtained by press molding. The Izod impact strength (notched) was 780 J/m.

EXAMPLE 18

The impact modifier obtained in Example 10(2) in an amount of 10 parts was added to 100 parts of poly(methyl methacrylate) (Parapet G, a trade name, mfd. by Kyowa Gas Chemical Industry Co., Ltd.) and melt kneaded at 190° C., followed by press molding at 200° C. to give a resin plate. Test pieces were cut from the resin plate and subjected to impact strength test (notched). The Izod impact strength (notched) was 75 J/m, which value was higher than the value of 30 J/m when no impact modifier was added.

EXAMPLE 19

The impact modifier obtained in Example 10(2) in an amount of 15 parts was added to 100 parts of polycarbonate resin (Iupilon S-100, a trade name, mfd. by Mitsubishi Gas Chemical Co., Inc.) and melt kneaded at 250° C., followed by press molding at 240° C. The Izod impact strength (notched) was 560 J/m, which value was higher than the value of 300 J/m when no impact modifier was added.

EXAMPLE 20

The impact modifier obtained in Example 10(2) in an amount of 15 parts was added to 100 parts of polypropylene (Hipol J800, a trade name, mfd. by Mitsui Petrochemical Industries, Ltd.) and melt kneaded at 180° C., followed by press molding at 190° C. The Izod impact strength (notched) was 50 J/m, which value was higher than the value of 20 J/m when no impact modifier was added.

COMPARATIVE EXAMPLE 8

A graft copolymer latex was prepared in the same manner as described in Example 16(2) except for using the following components ①, ③, ⑥ and ⑦.

| | | |
|---|---|---|
| Component ① | Graft rubber polymer latex | 1500 g |
| Component ③ | Acrylonitrile | 50.5 g |
| | Styrene | 102.0 g |
| | Cumene hydroperoxide | 0.55 g |
| Component ⑥ | Potassium oleate | 10.5 g |
| | Pure water | 587.5 g |
| Component ⑦ | Acrylonitrile | 129.8 g |
| | Styrene | 300 g |
| | Cumene hydroperoxide | 1.5 g |
| | t-Dodecyl mercaptan | 1.63 g |

The resulting latex was subjected to demulsification, followed by dehydration, washing, and drying to give a powder of impact modifier.

Using the resulting impact modifier, the Izod impact test was carried out in the same manner as described in Example 16(2). The Izod impact strength (notched) was 98 J/m.

EXAMPLE 21

The impact modifier obtained in Example 10(2) in an amount of 15 parts was added to 100 parts of polybutylene terephthalate (Teijin PBT, C7000, mfd. by Teijin, Ltd.) and melt kneaded at 240° C., followed by press molding. The Izod impact strength (notched) was 500 J/m, which value was remarkably higher than the value of 45 J/m when no impact modifier was added.

EXAMPLE 22

Figure 2:
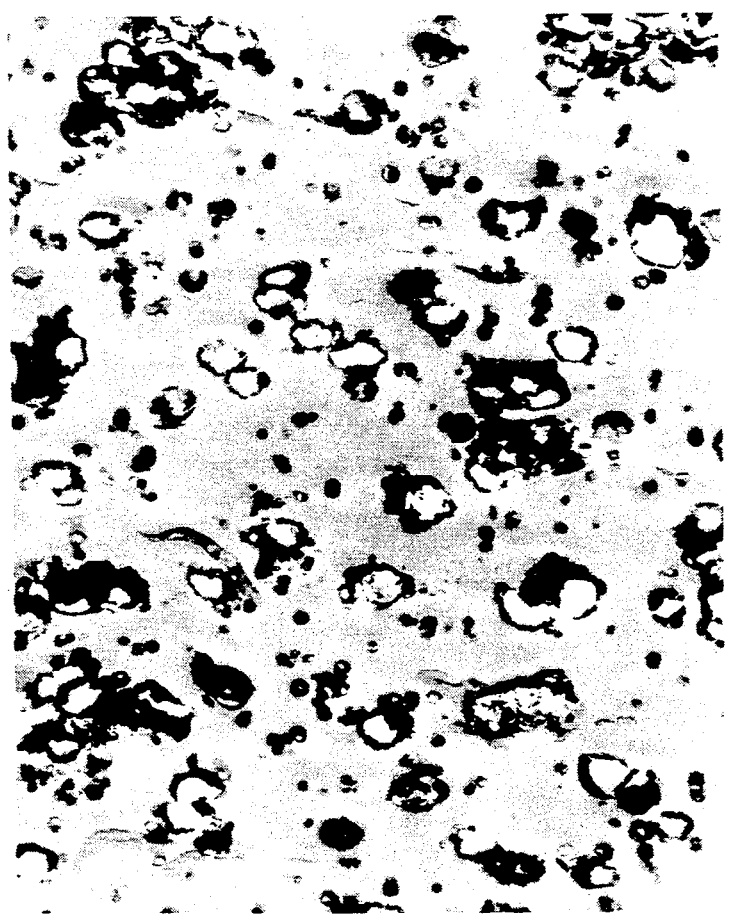
FIG. 2 is an electron microscope photograph with magnification of 10,000 of a $RuO_4$ stained ultrathin film sample showing the same structure as mentioned above.
Figure 3:
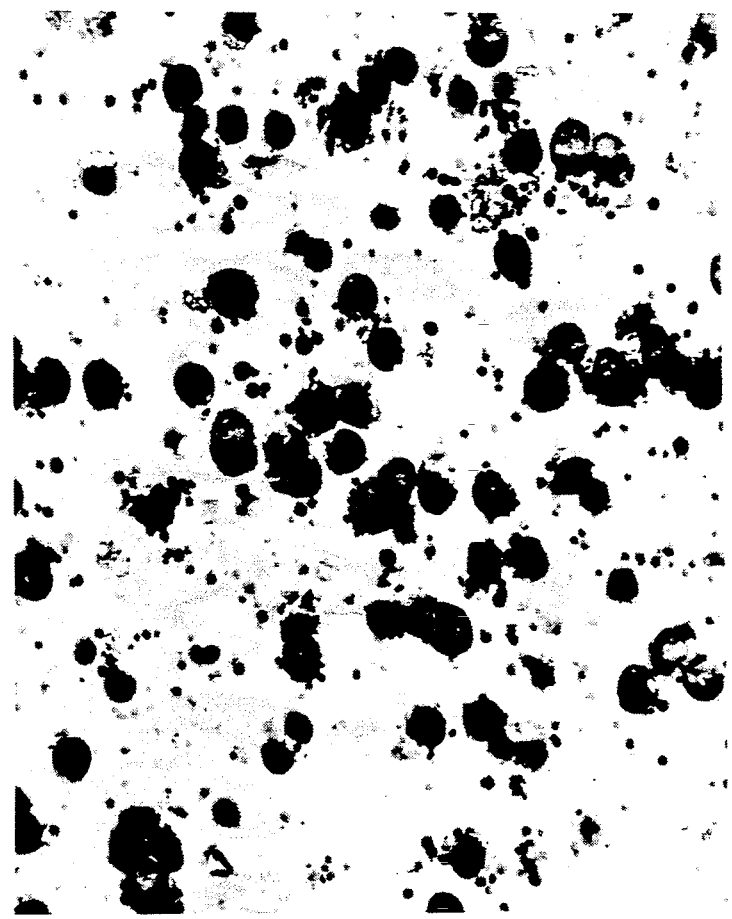
FIG. 3 is an electron microscope photograph H with magnification of 10,000 of a $OsO_4.RuO_4$ double stained ultrathin film sample showing the same structure as mentioned above.
Figure 4:
FIG. 4 is an electron microscope photograph with magnification of 40,000 of a $RuO_4$ stained ultrathin film sample showing the same structure as mentioned above.

An injection molded article obtained from the vinyl chloride resin composition obtained in Example 1 was cut to give ultrathin films and each cross-section was stained to examine particle structures. Staining was carried out by $OsO_4$ staining (FIG. 1), $RuO_4$ staining (FIGS. 2 and 4), and $OsO_4 \cdot RuO_4$ double staining (FIG. 3) according to the methods described in "Zairyo (Materials)" vol. 19, No. 197, pp 77–83 (1970) and "Macromolecules" 1983, vol. 16, pp. 589–598. The stained ultrathin films were subjected to observation for phase separation structures using a transmission type electron microscope (H-600 type, mfd. by Hitachi, Ltd.) at an accelerated voltage of 100 KV.

As is clear from FIGS. 1 to 4, composites comprising $OsO_4$ stainable particles having a particle size of about 0.1 to 0.5 μm, that is, nuclea made from butadiene rubber, and outer shells made from $RuO_4$ dyeable component, that is, butyl acrylate rubber, are dispersed in the matrix vinyl chloride type resin.

EXAMPLE 23

A press molded article obtained from the vinyl chloride resin composition obtained in Example 11 was cut to give ultrathin films and each cross-section was $RuO_4$ stained in the same manner as described in Example 22. The phase separation structure was observed using the transmission type electron microscope (H-600 type, mfd. by Hitachi, Ltd.) and shown in FIG. 5.

Figure 5:
FIG. 5 is an electron microscope photograph with magnification of 10,000 of a $RuO_4$ stained ultrathin film sample showing the structure of another example of molded articles.

As is clear from FIG. 5, composites comprising not-$RuO_4$ stained particles, i.e. butadiene rubber component covered with $RuO_4$ stainable component, i.e., acrylic rubber, are dispersed in the matrix vinyl chloride resin.

EXAMPLE 24

(1) Production of Graft Copolymer (C-1)

In a 4-liter reactor equipped with a stirrer, 1.0 part of potassium oleate was dissolved in 240 parts of deionized water at 30° to 35° C. with stirring. Then, 30 parts (as solid content) of polybutadiene rubber latex (SN-800T, a trade name, mfd. by Sumitomo Naugatuck Co., Ltd.), 1.4 part of triallyl isocyanurate and 70 parts of butyl acrylate were placed in the reactor to give an emulsion. The dissolved oxygen content in the emulsion was made 2 ppm or less (measured by a Polaro type DO meter RA, mfd. by Oriental Electric Co., Ltd.) by introducing nitrogen into the emulsion for about 1 hour. During that period, an aqueous solution obtained by dissolving 0.04 part of potassium persulfate in 10 parts of deionized water and an aqueous solution obtained by dissolving 0.004 part of sodium sulfite in 10 parts of deionized water were prepared, respectively. After making the dissolved oxygen content in the emulsion 2 ppm or less, the two aqueous solutions mentioned above were added to the emulsion and the temperature was raised to 60° to 65° C. while continuing the nitrogen replacement. After polymerizing for about 3 hours, the resulting emulsion was cooled. The conversion was 85%. This was named as graft rubber polymer (A).

Then, the following seven components were prepared.

| Component (1): | |
|---|---|
| Sodium lauryl sulfate | 1.2 parts |
| Potassium oleate | 5.0 parts |
| Deionized water | 240 parts |
| Component (2): | |
| Cumene hydroperoxide | 0.2 part |
| Acrylonitrile | 17.2 parts |
| Styrene | 35.0 parts |
| Component (3): | |
| Sodium formaldehyde sulfoxylate | 0.90 part |
| Deionized water | 60 parts |
| Component (4): | |
| Potassium carbonate | 4.4 parts |
| Deionized water | 120 parts |
| Component (5): | |
| Potassium leate | 3.7 parts |
| Deionized water | 200 parts |
| Component (6): | |
| Cumene hydroperoxide | 0.51 part |
| t-Dodecyl mercaptan | 0.56 part |
| Acrylonitrile | 44.4 parts |
| Styrene | 103.4 parts |
| Component (7): | |
| Potassium persulfate | 2.4 parts |
| Deionized water | 120 parts |

In a 4-liter reactor equipped with a stirrer, 800 parts (as solid content) of the graft rubber polymer (A) obtained above and the component (1) were placed and mixed uniformly. Then, the component (2) was added thereto with stirring to give an emulsion and the stirring was continued. After making the dissolved oxygen content in the emulsion 2 ppm or less by introducing nitrogen thereinto for about 1 hour, the component (3) was added thereto. The temperature was raised to 65° C. and polymerization was carried out at that temperature for about 1 hour (until conversion of about 70%). Then, a uniformly mixed solution of the components (4), (5) and (6) was added to the reactor dropwise in about 2 hours. Then, the reaction was continued for about 5 hours until the conversion became 80 to 85%. Then, the component (7) was added and the polymerization temperature was raised to 80° C. The polymerization was carried out at that temperature for about 2 hours to give a graft copolymer latex (C-1) having a conversion of 97% or more, followed by filtration, washing and drying.

(2) Production of Vinyl Chloride Type Resin Composition

To 90 parts of vinyl chloride type resin (D) having an average degree of polymerization 650 (copolymer of vinyl chloride and ethylene, Ryuron E-650, mfd. by Tosoh Corp.), a mixture of 10 parts of the graft copolymer (C-1) obtained in above (1), 3 parts of dibutyl tin maleate as a stabilizer (KS-1B, mfd. by Kyodo Chemical Co., Ltd.), 1 part of calcium stearate, and 0.5 part of stearyl stearate was added and melt kneaded in a single screw extruder having a diameter of 40 mm (mfd. by Thermoplastic Industry Co., Ltd.) to give pellets. Both the cylinder and die temperatures of the extruder were in the range of 150° to 180° C.

(3) Evaluation

Test pieces for measuring were obtained by injection molding using the pellets prepared in above (2) and an in-line screw type injection molding machine (SJ-25/35 type, mfd. by Meiki Co., Ltd.) at a cylinder temperature of 180° to 190° C. and a mold temperature of 50° to 55° C.

Various properties were measured according to JIS or ASTM standards.

Weathering resistance was measured using a sunshine weather meter by an accelerated weathering test (JIS A1415) and evaluated by the color difference ΔE after 1000 hours according to JIS A1411.

The Izod impact strength (V notched) was 1000 J/m at 23° C., and no destruction was caused by Izod impact test (no notch) at −10° C. and −30° C.

In the Du Pont type falling weight impact test (ASTM D2794-69) using test pieces of 2 mm thick, there were obtained 10.3 J at 23° C., 5.9 J at −10° C. and 4.9 J at −30° C.

Further, ΔE, which is a measure of weathering resistance, was 4-6 to show good weathering resistance.

EXAMPLES 25 AND 29

Using the graft copolymer (C-1) obtained in Example 24, vinyl chloride type resin compositions as shown in Table 4 were prepared and evaluated in the same manner as described in Example 24. The results are shown in Table 4.

EXAMPLES 26 TO 28

Using graft rubber polymers (A) in the course of producing the graft copolymer in Example 24, graft copolymers (C-2), (C-3) and (C-4) were produced by changing the monomers of the components (2) and (6) to other monomers but in the same manner as described in Example 24. In the case of (C-2), the same amount of methyl methacrylate was used in place of styrene. In the case of (C-3), the same amount as a total of methyl methacrylate was used in place of styrene and acrylonitrile. In the case of (C-4), the same amount of a mixture of styrene and α-methyl styrene (2:5 in weight ratio) was used in place of styrene. Using these graft copolymers, vinyl chloride type resin compositions as shown in Table 4 were produced and evaluated in the same manner as described in Example 24. The results are shown in Table 4.

COMPARATIVE EXAMPLE 9

Using 100 parts of the same vinyl chloride type resin alone as used in Example 24 without adding the graft copolymer thereto, the properties were evaluated in the same manner as described in Example 24.

The Izod impact strength (V notched) was 40 J/m at 23° C. The Izod impact strength (no notch) was 30 J/m at −10° C., and impossible to measure (under the lower limit of measurable values) at −30° C.

The Du Pont type falling weight impact strength was as low as 0.44 J at 23° C., 0.15 J at −10° C. and impossible to measure at −30° C.

The ΔE was 30 or more and deterioration in weathering resistance was remarkable.

As a result, the vinyl chloride type resin alone was inferior in impact resistance and weathering resistance to the compositions compounded with the graft copolymers.

The results are also shown in Table 4.

EXAMPLE 30

Using the graft copolymer (C-1) produced in Example 24, a vinyl chloride type resin composition as shown in Table 4 was produced and evaluated.

The Izod impact strength (V notched) was 187 J/m at 23° C., and the Izod impact strength (no notch) was 670 J/m at −10° C. and 340 J/m at −30° C.

The Du Pont type falling weight impact strength was 8.8 J at 23° C., and 4.9 J at −10° C. and −30° C.

The ΔE, which is a measure of weathering resistance, was 9-11 and excellent in the weathering resistance.

But with an increase of the graft copolymer component, the continuous phase is formed to lower the impact resistance.

The results are also shown in Table 4.

COMPARATIVE EXAMPLES 10 TO 12

Acrylic rubber polymers were produced without using butadiene rubber in the same manner as described in Example 24 for producing the graft copolymer. Using this, a graft copolymer (C-5) was produced. Using the graft copolymer (C-5), vinyl chloride type resin compositions as shown in Table 4 were produced and evaluated in the same manner as described in Example 24.

A resin composition using the graft copolymer (C-5) produced in the presence of acrylic rubber obtained by using only butyl acrylate having no nucleus of butadiene rubber shows poor Izod impact strength of 370 J/m at 23° C. (1000 J/m in Example 24 containing butadiene rubber as a nucleus). As to the weathering resistance, ΔE is 8-10, which is the same as Example 24.

The results are also shown in Table 4.

COMPARATIVE EXAMPLES 13 TO 15

A graft copolymer (C-6) was produced by using 800 parts of only butadiene rubber (SN-800T) in place of the graft copolymer (A) used in Example 24. Using this graft copolymer, vinyl chloride type resin compositions as shown in Table 4 were produced and evaluated in the same manner as described in Example 24.

A resin composition using the graft copolymer (C-6) produced in the presence of only butadiene rubber shows poor Izod impact strength of 560 J/m at 23° C. (1000 J/m in Example 24 using also acrylic rubber).

Further, ΔE is more than 30 and the weathering resistance is considerably poor. The results are also shown in Table 4.

(2) Production of Impact Modifier Graft Copolymer (C)

TABLE 4

|  |  | Example |  |  |  |  |  |  |
|---|---|---|---|---|---|---|---|---|
| Example No. |  | 24 | 25 | 26 | 27 | 28 | 29 | 30 |
| Vinyl chloride type resin | Vinyl chloride type resin (parts) | 90 | 91 | 90 | 90 | 90 | 80 | 30 |
| composition | Graft copolymer (parts) C-1 | 10 | 9 | — | — | — | 20 | 50 |
|  | C-2 | — | — | 10 | — | — | — | — |
|  | C-3 | — | — | — | 10 | — | — | — |
|  | C-4 | — | — | — | — | 10 | — | — |
|  | C-5 | — | — | — | — | — | — | — |
|  | C-6 | — | — | — | — | — | — | — |
| Izod impact strength (J/m) | 23° C. (V notched) | 1,000 | 700 | 720 | 460 | 650 | 1,200 | 187 |
|  | −10° C. (No notch) | >2,000 | >2,000 | >2,000 | >2,000 | >2,000 | >2,000 | 670 |
|  | −30° C. (No notch) | >2,000 | >2,000 | >2,000 | 870 | 1,240 | >2,000 | 340 |
| DuPont type falling weight impact strength (J) | 23° C. | 10.3 | 10.0 | 10.3 | 9.8 | 10.3 | 11.8 | 8.8 |
|  | −10° C. | 5.9 | 5.9 | 5.9 | 5.9 | 5.9 | 6.6 | 4.4 |
|  | −30° C. | 4.9 | 4.9 | 4.9 | 4.9 | 4.9 | 5.1 | 4.9 |
| Weathering resistance (ΔE) (Weather meter: 1000 hours) |  | 4~6 | 4~6 | 4~7 | 5~6 | 5~7 | 5~7 | 9~11 |

|  |  | Comparative Example |  |  |  |  |  |  |
|---|---|---|---|---|---|---|---|---|
| Example No. |  | 9 | 10 | 11 | 12 | 13 | 14 | 15 |
| Vinyl chloride type resin | Vinyl chloride type resin (parts) | 100 | 90 | 85 | 80 | 90 | 85 | 80 |
| composition | Graft copolymer (parts) C-1 | — | — | — | — | — | — | — |
|  | C-2 | — | — | — | — | — | — | — |
|  | C-3 | — | — | — | — | — | — | — |
|  | C-4 | — | — | — | — | — | — | — |
|  | C-5 | — | 10 | 15 | 20 | — | — | — |
|  | C-6 | — | — | — | — | 10 | 15 | 20 |
| Izod impact strength (J/m) | 23° C. (V notched) | 40 | 370 | 660 | 160 | 560 | 650 | 750 |
|  | −10° C. (No notch) | 30 | 1,290 | >2,000 | 570 | >2,000 | >2,000 | >2,000 |
|  | −30° C. (No notch) | — | 680 | 1,200 | 300 | 1,020 | 1,250 | >2,000 |
| DuPont type falling weight impact strength (J) | 23° C. | 0.44 | 6.6 | 6.9 | 6.9 | 8.8 | 9.8 | 10.3 |
|  | −10° C. | 0.15 | 2.0 | 4.4 | 4.4 | 4.9 | 5.1 | 5.1 |
|  | −30° C. | — | 1.5 | 2.5 | 2.9 | 2.9 | 2.9 | 2.5 |
| Weathering resistance (ΔE) (Weather meter: 1000 hours) |  | >30 | 8~10 | 8~10 | 8~10 | >30 | >30 | >30 |

EXAMPLE 31

(1) Production of Graft Rubber Polymer Latex (A)

In a 4-liter reactor equipped with a stirrer, the following butadiene rubber latex ①, emulsifier ② and butyl acrylate (containing 2% of crosslinking agent) ③ were placed and mixed uniformly to give an emulsion. After making the dissolved oxygen content in the emulsion 2 ppm or less by introducing nitrogen thereinto for about 1.5 hours, the following polymerization initiator ④ and auxiliary ⑤ were added thereto. The temperature was raised to 60° C. and the polymerization was carried out for about 2 hours at 60° C. to give a graft rubber copolymer latex (A) with a conversion of 75%.

| Component ① | Butadiene rubber latex (UB-1001S, mfd. by Nippon Zeon Co., Ltd., solid content 34%) | 1324 g |
|---|---|---|
| Component ② | Semi-hardened tallow fatty acid potassium salt (KS Soap, mfd. by Kao Corp.) | 11.6 g |
|  | Pure water | 1060 g |
| Component ③ | Butyl acrylate | 1050 g |
|  | Triallyl isocyanurate | 20 g |
| Component ④ | Potassium persulfate | 0.5 g |
|  | Pure water | 50 g |
| Component ⑤ | Sodium sulfite | 0.13 g |
|  | Pure water | 50 g |

In a 4-liter flask equipped with stirrer, the following graft rubber polymer latex ① obtained in above (1) (solid content 42%, containing unreacted polymerizable monomers), emulsifier ② and graft component ③ were placed and mixed uniformly to give an emulsion. After making the dissolved oxygen content in the emulsion 2 ppm or less by introducing nitrogen thereinto, the following initiator auxiliary ④ was added thereto and the temperature was raised to 65° C. After about 1.5 hours from the time reaching 65° C., the following component ⑤ was added, and then a uniformly emulsified mixture of the components ⑥ and ⑦ was added dropwise in about 1.5 hours. After completion of the dropwise addition, stirring was continued for further 3 hours. Then, the following component ⑧ was added thereto and the polymerization was carried out for 1 hour at 75° C. to give a graft copolymer latex with a conversion of 97% or more and substantially completed in polymerization. After cooling to room temperature, an aqueous solution of polyvinyl alcohol was added to the graft copolymer latex with stirring for coagulating. After repeating filtering and washing, and subsequent drying, a powder of impact modifier (graft copolymer) was obtained.

| Component ① | Graft rubber polymer latex | 2332 g |
|---|---|---|
| Component ② | Sodium lauryl sulfate | 1.2 g |
|  | Potassium oleate | 6.0 g |
|  | Pure water | 340 g |
| Component ③ | Acrylonitrile | 20.2 g |
|  | Styrene | 40.8 g |

-continued

| | | |
|---|---|---|
| | Cumene hydroperoxide | 0.22 g |
| Component ④ | Sodium formaldehyde sulfoxylate | 1.0 g |
| | Pure water | 60 g |
| Component ⑤ | K$_2$CO$_3$ | 5.1 g |
| | Pure water | 100 g |
| Component ⑥ | Potassium oleate | 4.2 g |
| | Pure water | 235 g |
| Component ⑦ | Acrylonitrile | 51.9 g |
| | Styrene | 120 g |
| | Cumene hydroperoxide | 0.6 g |
| | t-Dodecyl mercaptan | 0.65 g |
| Component ⑧ | Potassium persulfate | 1.2 g |
| | Pure water | 100 g |

(3) Polycarbonate resin composition

The obtained impact modifier in an amount 10 parts was compounded with 100 parts of polycarbonate resin (Iupilon S-100, mfd. by Mitsubishi Gas Chemical Co., Inc.), melt kneaded at 250° C. and press molded at 240° C. to give a resin plate of 3 mm thick. Test pieces were cut from the resin plate. The Izod impact strength (notched) was 490 J/m, which values was very high compared with the value of 300 J/m when no impact modifier was added.

EXAMPLE 32

The impact modifier obtained in Example 31 in an amount of 10 parts was compounded with 100 parts of poly(methyl methacrylate) (Parapet G-1000, mfd. by Kyowas Gas Chemical Industry Co., Ltd.), melt kneaded at 190° C., and press molded at 200° C. to give a resin plate of 3 mm thick. Test pieces were cut from the resin plate. The Izod impact strength (notched) was 80 J/m, which value was higher than the valve of 30 J/m when no impact modifier was added.

EXAMPLE 33

The impact modifier obtained in Example 31 in an amount of 10 parts was compounded with 100 parts of polypropylene (Hipol J800, mfd. by Mitsui Petrochemical Industries, Ltd.), melt kneaded at 180° C., and press molded at 190° C. to give a resin plate of 3 mm thick. Test pieces were cut from the resin plate. The Izod impact strength (notched) was 40 J/m, which value was higher than the value of 20 J/m, when no impact modifier was added.

EXAMPLE 34

A graft copolymer latex was prepared in the same manner as described in Example 31(2) except for using the following components ① to ⑧. After coagulating, filtering, washing and drying, there was obtained a powder of impact modifier.

| | | |
|---|---|---|
| Component ① | Graft rubber polymer latex obtained in Example 31(1) (solid content 42%) | 2571 parts |
| Component ② | Sodium lauryl sulfate | 1.2 parts |
| | Potassium oleate | 6.0 parts |
| | Deionized water | 340 parts |
| Component ③ | Acrylonitrile | 10.1 parts |
| | Styrene | 20.4 parts |
| | Cumene hydroperoxide | 0.11 parts |
| Component ④ | Sodium formaldehyde sulfoxylate | 1.03 parts |
| | Deionized water | 60 parts |
| Component ⑤ | Potassium carbonate | 5.26 parts |
| | Deionized water | 100 parts |
| Component ⑥ | Potassium oleate | 2.1 parts |
| | Deionized water | 120 parts |
| Component ⑦ | Acrylonitrile | 26.0 parts |
| | Styrene | 60.0 parts |
| | Cumene hydroperoxide | 0.3 parts |
| | t-Dodecyl mercaptan | 0.33 parts |
| Component ⑧ | Potassium persulfate | 2.5 parts |
| | Deionized water | 100 parts |

The resulting impact modifier in an amount of 8 parts was compounded with 100 parts of vinyl chloride homopolymer (TK-1000, mfd. by Shin-Etsu Chemical Co., Ltd.), 3 parts of dibutyl tin maleate as a stabilizer, 0.5 part of calcium stearate and 0.5 part of stearyl stearate and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut out of the resin plate and subjected to the following tests with the following results.

| | |
|---|---|
| Izod impact strength (notched) | 1120 J/m |
| Flexural strength (ASTM D790) | 52 MPa |
| Flexural modulus (ASTM D790) | 2180 MPa |
| Vicat softening temperature (JIS K7206) | 94.5° C. |
| Melt flow rate (JIS K7210) (200° C., 98N) | 0.39 |

EXAMPLE 35

A graft copolymer latex was prepared in the same manner as described in Example 24 except for using the following graft rubber polymer (A) and the components (1) to (7). After coagulating, filtering, washing and drying, there was obtained a powder of impact modifier.

| Graft rubber polymer (A): | | |
|---|---|---|
| | The graft rubber polymer latex obtained in Example 24(1) (solid content: 40%) | 2037 parts |
| Component (1) | Sodium lauryl sulfate | 1.2 parts |
| | Potassium oleate | 5.0 parts |
| | Deionized water | 240 parts |
| Component (2) | Acrylonitrile | 30.3 parts |
| | Styrene | 61.2 parts |
| | Cumene hydroperoxide | 0.32 parts |
| Component (3) | Sodium formaldehyde sulfoxylate | 1.63 parts |
| | Deionized water | 100 parts |
| Component (4) | Potassium carbonate | 7.65 parts |
| | Deionized water | 120 parts |
| Component (5) | Potassium oleate | 6.3 parts |
| | Deionized water | 350 parts |
| Component (6) | Acrylonitrile | 77.8 parts |
| | Styrene | 180 parts |
| | Cumene hydroperoxide | 0.9 parts |
| | t-Dodecyl mercaptan | 1.0 parts |
| Component (7) | Potassium persulfate | 3 parts |
| | Deionized water | 100 parts |

The obtained impact modifier in an amount of 10 parts was compounded with 90 parts of vinyl chloride resin having an average degree of polymerization of 650 (Ryuron E650, mfd. by Tosoh Corp.), 3 parts of dibutyl tin maleate as a stabilizer, 0.5 part of calcium stearate, and 0.5 part of stearyl stearate, and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut from the resin plate and subjected to the following tests in the same manner as described in Example 34 with the following results.

| Izod impact strength (notched) | 400 J/m |
|---|---|
| Flexural strength | 58 MPa |
| Vicat softening temperature | 81.9° C. |

EXAMPLE 36

A graft copolymer latex was obtained in the same manner as described in Example 24 except for using the following graft rubber copolymer (A) and the components (1) to (7). After coagulating, filtering, washing and drying, there was obtained an impact modifier.

| Graft rubber copolymer (A): | | |
|---|---|---|
| | Graft rubber polymer latex obtained in Example 24(1) (solid content: 40%) | 1730 parts |
| Component (1) | Sodium lauryl sulfate | 1.02 parts |
| | Potassium oleate | 5.1 parts |
| | Deionized water | 200 parts |
| Component (2) | Acrylonitrile | 25.7 parts |
| | Styrene | 52 parts |
| | Cumene hydroperoxide | 0.27 parts |
| Component (3) | Sodium folmaldehyde sulfoxylate | 1.4 parts |
| | Deionized water | 100 parts |
| Component (4) | Potassium carbonate | 6.5 parts |
| | Deionized water | 150 parts |
| Component (5) | Potassium oleate | 5.34 parts |
| | Deionized water | 300 parts |
| Component (6) | Acrylonitrile | 66.1 parts |
| | Styrene | 66.1 parts |
| | α-Methyl styrene | 86.8 parts |
| | Cumene hydroperoxide | 3.3 parts |
| | t-Dodecyl mercaptan | 0.85 parts |
| Component (7) | Potassium persulfate | 3 parts |
| | Deionized water | 100 parts |

The obtained impact modifier in an amount of 10 parts was compounded with 90 parts of vinyl chloride resin (Ryuron E650, mfd. by Tosoh Corp.), 3 parts of dibutyl tin maleate as a stabilizer, 0.5 parts of calcium stearate and 0.5 part of stearyl stearate and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut out of the resin plate and subjected to the tests in the same manner as described in Example 34 with the following results.

| Izod impact strength (notched) | 370 J/m |
|---|---|
| Flexural strength | 58 MPa |
| Flexural modulus | 2200 MPa |
| Vicat softening temperature | 80.1° C. |
| Melt flow rate (190° C., 98N) | 3.3 |

EXAMPLE 37

A graft copolymer latex was obtained in the same manner as described in Example 24 except for using the following graft rubber polymer (A) and the components (1) to (7). After coagulating, filtering, washing and drying, there was obtained a powder of impact modifier.

| Graft rubber polymer (A): | | |
|---|---|---|
| | Graft rubber polymer latex obtained in Example 24(1) (solid content: 40%) | 1632 parts |
| Component (1) | Sodium lauryl sulfate | 1.0 parts |
| | Potassium oleate | 4.2 parts |
| | Deionized water | 200 parts |
| Component (2) | Acrylonitrile | 14.1 parts |
| | Methyl methacrylate | 28.6 parts |
| | Cumene hydroperoxide | 0.15 parts |
| Component (3) | Sodium formaldehyde sulfoxylate | 0.7 parts |
| | Deionized water | 50 parts |
| Component (4) | Potassium carbonate | 3.6 parts |
| | Deionized water | 100 parts |
| Component (5) | Potassium oleate | 3.0 parts |
| | Deionized water | 160 parts |
| Component (6) | Acrylonitrile | 36.4 parts |
| | Methyl methacrylate | 84.0 parts |
| | Cumene hydroperoxide | 0.42 parts |
| | t-Dodecyl mercaptane | 0.46 parts |
| Component (7) | Potassium persulfate | 3.0 parts |
| | Deionized water | 100 parts |

The obtained impact modifier in an amount of 10 parts was compounded with 90 parts of vinyl chloride-ethylene copolymer having an average degree of polymerization of 650 (Ryuron E-650, mfd. by Tosoh Corp.), 3 parts of dibutyl tin maleate as a stabilizer, 0.5 parts of calcium stearate and 0.5 part of stearyl stearate, and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut out of the resin plate and subjected to the tests in the same manner as described in Example 34 with the following results.

| Izod impact strength (notched) | 600 J/m |
|---|---|
| Flexural strength | 56 MPa |
| Flexural modulus | 2100 MPa |
| Vicat softening temperature | 80.3° C. |
| Melt flow rate (190° C., 98N) | 2.8 |

EXAMPLE 38

A graft copolymer latex was prepared in the same manner as described in Example 24 except for using the following graft rubber copolymer (A) and the components (1) to (7). After coagulating, filtering, washing and drying, there was obtained a powder of impact modifier.

| Graft rubber polymer (A): | | |
|---|---|---|
| | Graft rubber polymer latex obtained in Example 24(1) (solid content: 40%) | 2332 parts |
| Component (1) | Sodium lauryl sulfate | 1.2 parts |
| | Potassium oleate | 6.0 parts |
| | Deionized water | 340 parts |
| Component (2) | Methyl methacrylate | 61.0 parts |
| | Cumene hydroperoxide | 0.22 parts |
| Component (3) | Sodium formaldehyde sulfoxylate | 1.0 part |
| | Deionized water | 60 parts |
| Component (4) | Potassium carbonate | 5.1 parts |
| | Deionized water | 100 parts |
| Component (5) | Potassium oleate | 4.2 parts |
| | Deionized water | 235 parts |
| Component (6) | Methyl methacrylate | 171.9 parts |
| | Cumene hydroperoxide | 0.6 parts |
| | t-Dodecyl mercaptan | 0.65 parts |

| Graft rubber polymer (A): | | |
|---|---|---|
| Component (7) | Potassium persulfate | 1.2 parts |
| | Deionized water | 100 parts |

The obtained impact modifier in an amount of 10 parts was compounded with 90 parts of vinyl chloride-ethylene copolymer having an average degree of polymerization of 650 (Ryuron E-650, mfd. by Tosoh Corp.), 3 parts of dibutyl tin maleate as a stabilizer, 0.5 parts of calcium stearate and 0.5 part of stearyl stearate, and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut out of the resin plate and subjected to the tests in the same manner as described in Example 34 with the following results.

| Izod impact strength (notched) | 380 J/m |
|---|---|
| Flexural strength | 57 MPa |
| Flexural modulus | 2110 MPa |
| Vicat softening temperature | 81.2° C. |
| Melt flow rate (190° C., 98N) | 4.6 |

EXAMPLE 39

A graft copolymer latex was prepared in the same manner as described in Example 24 except for using the following graft rubber polymer (A) and the components (1) to (7). After coagulating, filtering, washing and drying, there was obtained a powder of impact modifier.

| Graft rubber polymer (A): | | |
|---|---|---|
| | Graft rubber polymer latex obtained in Example 24(1) (solid content: 40%) | 2332 parts |
| Component (1) | Sodium lauryl sulfate | 1.2 parts |
| | Potassium oleate | 6.0 parts |
| | Deionized water | 340 parts |
| Component (2) | Styrene | 61.0 parts |
| | Cumene hydroperoxide | 0.22 parts |
| Component (3) | Sodium formaldehyde sulfoxylate | 1.0 parts |
| | Deionized water | 60 parts |
| Component (4) | Potassium carbonate | 5.1 parts |
| | Deionized water | 100 parts |
| Component (5) | Potassium oleate | 4.2 parts |
| | Deionized water | 235 parts |
| Component (6) | Styrene | 55.4 parts |
| | Methyl methacrylate | 0.6 parts |
| | t-Dodecyl mercaptan | 0.65 parts |
| Component (7) | Potassium persulfate | 1.2 parts |
| | Deionized water | 100 parts |

The obtained impact modifier in an amount of 10 parts was compounded with 90 parts of vinyl chloride resin having an average degree of polymerization of 650 (Ryuron E-650, mfd. by Tosoh Corp.), 3 parts of dibutyl tin maleate, 0.5 part of calcium stearate and 0.5 part of stearyl stearate, and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut out of the resin plate and subjected to the tests in the same manner as described in Example 34 with the following results.

| Izod impact strength (notched) | 430 J/m |
|---|---|
| Flexural strength | 56 MPa |
| Flexural modulus | 2100 MPa |
| Vicat softening temperature | 80.5° C. |
| Melt flow rate (190° C., 98N) | 3.3 |

EXAMPLE 40

A graft copolymer latex was prepared in the same manner as described in Example 24 except for using the following graft rubber polymer (A) and components (1) to (7). After coagulating, filtering, washing and drying, there was obtained a powder of impact modifier.

| Graft rubber polymer (A): | | |
|---|---|---|
| | Graft rubber polymer (A) obtained in Example 24(1) (solid content: 40%) | 1748 parts |
| Component (1) | Sodium lauryl sulfate | 1.2 parts |
| | Potassium oleate | 6.0 parts |
| | Deionized water | 340 parts |
| Component (2) | Acrylonitrile | 40.4 parts |
| | Styrene | 81.6 parts |
| | Cumene hydroperoxide | 0.43 parts |
| Component (3) | Sodium formaldehyde sulfoxylate | 1.63 parts |
| | Deionized water | 100 parts |
| Component (4) | Potassium carbonate | 10.2 parts |
| | Deionized water | 170 parts |
| Component (5) | Potassium oleate | 8.3 parts |
| | Deionized water | 470 parts |
| Component (6) | Acrylonitrile | 103.7 parts |
| | Styrene | 240.1 parts |
| | Cumene hydroperoxide | 1.2 parts |
| | t-Dodecyl mercaptan | 1.31 parts |
| Component (7) | Potassium persulfate | 1.2 parts |
| | Deionized water | 100 parts |

The obtained impact modifier in an amount of 10 parts was compounded with 90 parts of vinyl chloride resin having an average degree of polymerization of 650 (Ryuron E-650, mfd. by Tosoh Corp.), 3 parts of dibutyl tin maleate as a stabilizer, 0.5 part of calcium stearate, and 0.5 part of stearyl stearate, and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut from the resin plate and subjected to the tests in the same manner as described in Example 34 with the following results.

| Izod impact strength (notched) | 200 J/m |
|---|---|
| Flexural strength | 60 MPa |
| Flexural modulus | 2100 MPa |
| Vicat softening temperature | 81.9° C. |
| Melt flow rate (190° C., 98N) | 3.4 |

COMPARATIVE EXAMPLE 16

A graft copolymer latex was obtained in the same manner as described in Example 24 except for using the following graft rubber copolymer (A) and components (1) to (7). After coagulating, filtering, washing and drying, there was obtained a powder of impact modifier.

| | Graft rubber polymer (A): | |
|---|---|---|
| | Graft rubber polymer latex obtained in Example 24(1) (solid content: 40%) | 1500 parts |
| Component (1) | Sodium lauryl sulfate | 1.2 parts |
| | Potassium oleate | 6.0 parts |
| | Deionized water | 340 parts |
| Component (2) | Acrylonitrile | 50.5 parts |
| | Styrene | 102 parts |
| | Cumene hydroperoxide | 0.55 parts |
| Component (3) | Sodium formaldehyde sulfoxylate | 1.03 parts |
| | Deionized water | 60 parts |
| Component (4) | Potassium carbonate | 5.26 parts |
| | Deionized water | 100 parts |
| Component (5) | Potassium oleate | 10.5 parts |
| | Deionized water | 588 parts |
| Component (6) | Acrylonitrile | 129.8 parts |
| | Styrene | 300 parts |
| | Cumene hydroperoxide | 1.5 parts |
| | t-Dodecyl mercaptan | 1.63 parts |
| Component (7) | Potassium persulfate | 2.5 parts |
| | Deionized water | 100 parts |

The obtained impact modifier in an amount of 10 parts was compounded with 90 parts of vinyl chloride resin having an average degree of polymerization of 650 (Ryuron E650, mfd. by Tosoh Corp.), 3 parts of dibutyl tin maleate as a stabilizer, 0.5 part of calcium stearate and 0.5 part of stearyl stearate, and melt kneaded using a single screw extruder having a diameter of 40 mm (mfd. by Thermoplastic Industry Co., Ltd.) to give pellets. The pellets were compression molded to give a resin plate of 150 mm wide, 150 mm long and 3 mm thick. Test pieces were cut from the resin plate and subjected to the tests in the same manner as described in Example 34 with the following results.

| Izod impact strength (notched) | 80 J/m |
|---|---|
| Flexural strength | 60 MPa |
| Flexural modulus | 2200 MPa |
| Vicat softening temperature | 82.0° C. |
| Melt flow rate (190° C., 98N) | 3.5 |

EXAMPLES 41 TO 43, COMPARATIVE EXAMPLE 17

The impact modifier obtained in Example 31 in amounts as listed in Table 5 was compounded with 100 parts of vinyl chloride resin having an average degree of polymerization of 800 (TK-800, mfd. by Shin-Etsu Chemical Co., ltd.), 3 parts of dibutyl tin maleate as a stabilizer, 1 part of polyethylene wax and 0.5 part of calcium stearate, melt kneaded at 170° C., and press molded at 190° C. to give a resin plate. Test pieces were cut out of the resin plate and subjected to the tests in the same manner as described in Example 34. The results are shown in Table 5.

TABLE 5

| | Comparative Example | Example | | |
|---|---|---|---|---|
| Example No. | 17 | 41 | 42 | 43 |
| Amount of impact modifier (parts) | 0 | 6 | 8 | 10 |
| Izod impact strength (J/m) | 62 | 400 | 860 | 980 |
| Tensile strength (MPa) | 55 | 48 | 45 | 42 |
| Flexural modulus (MPa) | 2820 | 2300 | 2270 | 2240 |

TABLE 5-continued

| | Comparative Example | Example | | |
|---|---|---|---|---|
| Example No. | 17 | 41 | 42 | 43 |
| Vicat softening temperature (°C.) | 92.4 | 91.5 | 91.5 | 91.0 |

EXAMPLES 44 TO 46, COMPARATIVE EXAMPLE 18

The impact modifier obtained in Example 31 in an amount of as listed in Table 6 was compounded with 100 parts of vinyl chloride resin having an average degree of polymerization of 1050 (TK-1000, mfd. by Shin-Etsu Chemical Co., Ltd.), 1 part of tribasic lead sulfate, 0.5 part of dibasic lead stearate, 2 parts of lead stearate, 0.3 part of barium stearate, and 0.2 part of calcium stearate, melt kneaded at 170° C. and press molded at 190° C. to give a resin plate. Test pieces were cut out of the resin plate and subjected to the tests in the same manner as described in Example 34. The results are shown in Table 6.

TABLE 6

| | Comparative Example | Example | | |
|---|---|---|---|---|
| Example No. | 18 | 44 | 45 | 46 |
| Amount of impact modifier (parts) | 0 | 6 | 8 | 10 |
| Izod impact strength (J/m) | 86 | 450 | 1090 | 1250 |
| Tensile strength (MPa) | 54 | 50 | 46 | 45 |
| Flexural modulus (MPa) | 2730 | 2300 | 2220 | 2230 |
| Vicat softening temperature (°C.) | 96.8 | 95.5 | 95.2 | 94.4 |

EXAMPLE 47

The impact modifier obtained in Example 31 in an amount of 9 parts was compounded with vinyl chloride-ethylene copolymer having an average degree of polymerization of 650 (ethylene content 4% or less, Ryuron E650, mfd. by Tosoh Corp.), 3 parts of dibutyl tin maleate as a stabilizer, 1 part of calcium stearate, and 0.5 part of stearyl stearate, and melt kneaded at 150° to 180° C. using a full-flight single screw extruder having a diameter of 40 mm (mfd. by Thermoplastic Industry Co., Ltd.) to give pellets. The pellets were press molded at 185° to 195° C. to give a resin plate. Test pieces were cut out of the resin plate and subjected to the Izod impact test. The Izod impact strength (notched) was 870 J/m.

COMPARATIVE EXAMPLE 19

(1) Production of Graft Rubber Polymer

A graft rubber polymer was prepared using the same apparatus and the same components as used in Example 31(1). After 30 minutes from the time reached 60° C., the reaction system was cooled to give a graft rubber polymer latex with a conversion of 46%.

(2) Production of Graft Copolymer (C)

A graft copolymer powder was produced in the same manner as described in Example 31(2) except for using the graft rubber polymer obtained in above (1) in the same amount as in Example 31 as the graft rubber polymer latex ①.

(3) Production of Vinyl Chloride Type Resin Composition

A vinyl chloride type resin composition was prepared in the same manner as described in Example 47 except for using 9 parts of the powder of graft copolymer (C) obtained in above (2). Test pieces were prepared and subjected to the test in the same manner as described in Example 47.

The Izod impact strength (notched) was 400 J/m, which value was lower than that obtained in Example 47.

EXAMPLE 48

(1) Production of Graft Rubber Polymer Latex

The polymerization was carried out using the same apparatus and the same components as used in Example 31(1). After about 2 hours from the time reaching 60° C., 0.5 g of potassium persulfate dissolved in 50 g of deionized water was added thereto. The polymerization was carried out at 60° C. for further 3 hours to give a graft rubber polymer latex (A) with a conversion of 98% or more and substantially completed in polymerization.

(2) Production of Graft Copolymer (C)

A powder of graft copolymer was produced in the same manner as described in Example 31(2) except for using the latex produced in above (1) in the same amount as in Example 31 as the graft rubber polymer latex ①.

(3) Production of Vinyl Chloride type Resin Composition

The graft copolymer powder obtained in above (2) in an amount 9 parts was mixed with 100 parts of vinyl chloride-ethylene copolymer having an average degree of polymerization of 650 (Ryuron E650, mfd. by Tosoh Corp.) to produce a vinyl chloride type resin composition in the same manner as described in Example 47. Test pieces were obtained from the vinyl chloride type resin composition and subjected to the test in the same manner as described in Example 47. The Izod impact strength (notched) was 550 J/m, which value was lower than that of Example 47 but higher than that of Comparative Example 19.

As mentioned above, the impact modifiers of the present invention can impart particularly excellent impact resistance (Izod impact strength, Du Pont type falling weight impact test) and weathering resistance to thermoplastic resins without losing excellent inherent properties of the resins.

Thus, the thermoplastic resin compositions of the present invention can be used in various electric appliances, house-building parts and materials for outdoor or indoor uses, molded articles of furniture, and the like.

What is claimed is:

1. An impact modifier of a graft copolymer (C) obtained by (i) emulsion polymerizing
   (a) 99 to 20 parts by weight of a polymerizable monomer mixture comprising
      (I) 0.1 to 20% by weight of a polyfunctional monomer,
      (II) 50 to 99.9% by weight of an acrylic acid alkyl ester, the alkyl moiety thereof having 1 to 13 carbon atoms, and
      (III) 0 to 30% by weight of a copolymerizable vinyl compound other than those mentioned above,
   in the presence of
   (b) 1 to 80 parts by weight of a conjugated diene rubber,
   a total of the components (a) and (b) being 100 parts by weight, to a conversion of 50 to 93% by weight to give a graft rubber polymer (A) containing unreacted polymerizable monomers, and (ii) polymerizing
   (B) 40 parts by weight or less and more than 0 part by weight of one or more monomers comprising
      (IV) 0 to 100% by weight of an acrylic acid alkyl ester having an alkyl moiety of 1 to 13 carbon atoms,
      (V) 0 to 100% by weight of styrene or substituted styrene,
      (VI) 0 to 100% by weight of a methacrylic acid alkyl ester, and
      (VII) 0 to 40% by weight of a vinyl cyanide compound,
   in the presence of 60 parts by weight or more and less than 100 parts by weight of the graft rubber polymer (A), a total of the monomers (B) and the graft rubber polymer (A) being 100 parts by weight.

2. An impact modifier according to claim 1, wherein the amount of the graft rubber polymer (A) is 60 to 99% by weight, and the amount of the monomers (B) is 40 to 1% by weight.

3. An impact modifier according to claim 1, wherein the monomers (B) in amounts of 5 to 30% by weight are polymerized in the presence of the graft rubber polymer (A), followed by polymerization of the rest of the monomers (B), each of the monomers (B) separately added comprising
   (IV) 0 to 100% by weight of an acrylic acid alkyl ester having an alkyl moiety of 1 to 13 carbon atoms,
   (V) 0 to 100% by weight of styrene or substituted styrene,
   (VI) 0 to 100% by weight of a methacrylic acid alkyl ester, and
   (VII) 0 to 40% by weight of a vinyl cyanide compound.

4. An impact modifier according to claim 1, wherein the graft rubber polymer (A) is obtained by emulsion polymerization of 95 to 55 parts by weight of the polymerizable monomers (a) in the presence of 5 to 45 parts by weight of the conjugated diene rubber (b), the total being 100 parts by weight.

5. An impact modifier according to claim 1, wherein the graft rubber polymer (A) is obtained by emulsion polymerization of 80 to 55 parts by weight of the polymerizable monomers (a) in the presence of 20 to 45 parts by weight of the conjugated diene rubber (b), the total being 100 parts by weight.

6. An impact modifier according to claim 1, wherein the polyfunctional monomer (I) is at least one member selected from the group consisting of triallyl isocyanurate, triallyl cyanurate, dicyclopentadiene acrylate and dicyclopentadiene methacrylate.

* * * * *